(12) United States Patent
Trail

(10) Patent No.: US 10,725,308 B1
(45) Date of Patent: Jul. 28, 2020

(54) DYNAMIC ATTENUATOR FOR COMBINING REAL WORLD AND VIRTUAL CONTENT

(71) Applicant: Facebook Technologies, LLC, Menlo Park, CA (US)

(72) Inventor: Nicholas Daniel Trail, Bothell, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 37 days.

(21) Appl. No.: 16/154,425

(22) Filed: Oct. 8, 2018

(51) Int. Cl.
*G02B 27/28* (2006.01)
*G02B 27/01* (2006.01)
*G06T 19/00* (2011.01)

(52) U.S. Cl.
CPC ....... *G02B 27/281* (2013.01); *G02B 27/0172* (2013.01); *G06T 19/006* (2013.01); *G02B 2027/012* (2013.01); *G02B 2027/0123* (2013.01)

(58) Field of Classification Search
CPC .. G02B 27/281; G02B 27/0172; G06T 19/006
USPC ................................................ 345/7, 8, 690
See application file for complete search history.

(56) References Cited

U.S. PATENT DOCUMENTS

| 8,488,243 B2 * | 7/2013 | McKnight | A63F 13/10 |
| | | | 359/618 |
| 2015/0092083 A1 * | 4/2015 | Lam | G02B 27/017 |
| | | | 348/234 |
| 2016/0282639 A1 * | 9/2016 | von und zu Liechtenstein | ........... |
| | | | G01J 4/00 |
| 2017/0202633 A1 * | 7/2017 | Liu | A61B 90/00 |

* cited by examiner

*Primary Examiner* — Calvin C Ma
(74) *Attorney, Agent, or Firm* — Fenwick & West LLP

(57) ABSTRACT

A head-mounted display (HMD) presented herein comprises a shell and a controller. The shell encloses a display element and includes a dynamic attenuator having one or more controllable pixels that control an amount of light from the local area to an eye box of the HMD. The controller determines, based on positional information for one or more objects in a local area surrounding the HMD, whether a user wearing the HMD is within a threshold distance of an object in the local area. Responsive to the determination, the controller identifies a field of view that includes the object. The controller instructs the dynamic attenuator to allow light from the local area over the identified field of view into the HMD.

19 Claims, 8 Drawing Sheets

DYNAMIC ATTENUATOR FOR COMBINING REAL WORLD AND VIRTUAL CONTENT

BACKGROUND

The present disclosure generally relates to displaying content to a user wearing a head-mounted display (HMD) as part of an artificial reality system, and specifically relates to a dynamic attenuator as part of the HMD for combining real world and virtual content.

Artificial reality systems may enable users to have more immersive experiences than ordinary television or game consoles can provide. While wearing an HMD, a user can view different portions of a captured scene or an artificially generated scene simply by orienting his or her head, just as the user naturally does to view a real-world environment. The scene may be presented in the HMD to the user based on the position and orientation of the user's head, such that the scene changes based on changes in the position and orientation of the user's head. A mobile artificial reality system can also account for the movement of the user as the user walks around in the real-world environment, such that the user perceives him or herself to be moving in a virtual environment.

Although immersive, these features may permit the user to engage with the virtual environment in a way that causes the user to forget important aspects of the user's real-world environment. For example, a user trying to walk from one position in a virtual environment to another position may fail to account for (or be unable to see) a real-world obstacle, such as a table, a couch, or a wall due to the user's lack of awareness of the real-world environment. This may result in a collision with the real-world environment or a feature in the real-world environment.

SUMMARY

Embodiments of the present disclosure support a head-mounted display (HMD) for combining real world content with virtual content. The HMD comprises a shell and a controller. The shell encloses a display element and includes a dynamic attenuator that dynamically controls (e.g., based on instructions from the controller) attenuation of light from the real world propagating into the HMD. The dynamic attenuator includes at least one controllable pixel that controls an amount of light from the real world reaching an eye box of the HMD. The at least one controllable pixel may include at least one controllable liquid crystal (LC) cell and a pair of polarization assemblies (e.g., a pair of polarizers). The controller determines, based on positional information for one or more objects in a local area surrounding the HMD, whether the HMD is within a threshold distance of an object of the one or more objects in the local area. When the HMD is within the threshold distance of the object, the controller identifies a field of view that includes the object and instructs the at least one controllable pixel of the dynamic attenuator to allow light from the local area over the identified field of view into the HMD. The controller may also lower a level of detail in the rendering (e.g., resolution, detailed texture), and/or reduce brightness of a portion of content presented on the display element over the identified field of view.

In some embodiments a method for combining real world content with virtual content is described. Positional information is generated for one or more objects in a local area surrounding an HMD, and based on the positional information it is determined whether the HMD is within a threshold distance of an object in the local area. Responsive to the determination, a field of view is identified that includes the object. A dynamic attenuator included in a shell enclosing a display element of the HMD is instructed to allow light from the local area over the identified field of view into the HMD, based on one or more controllable pixels of the dynamic attenuator that control an amount of light from the local area to an eye box of the HMD.

Figure 1:
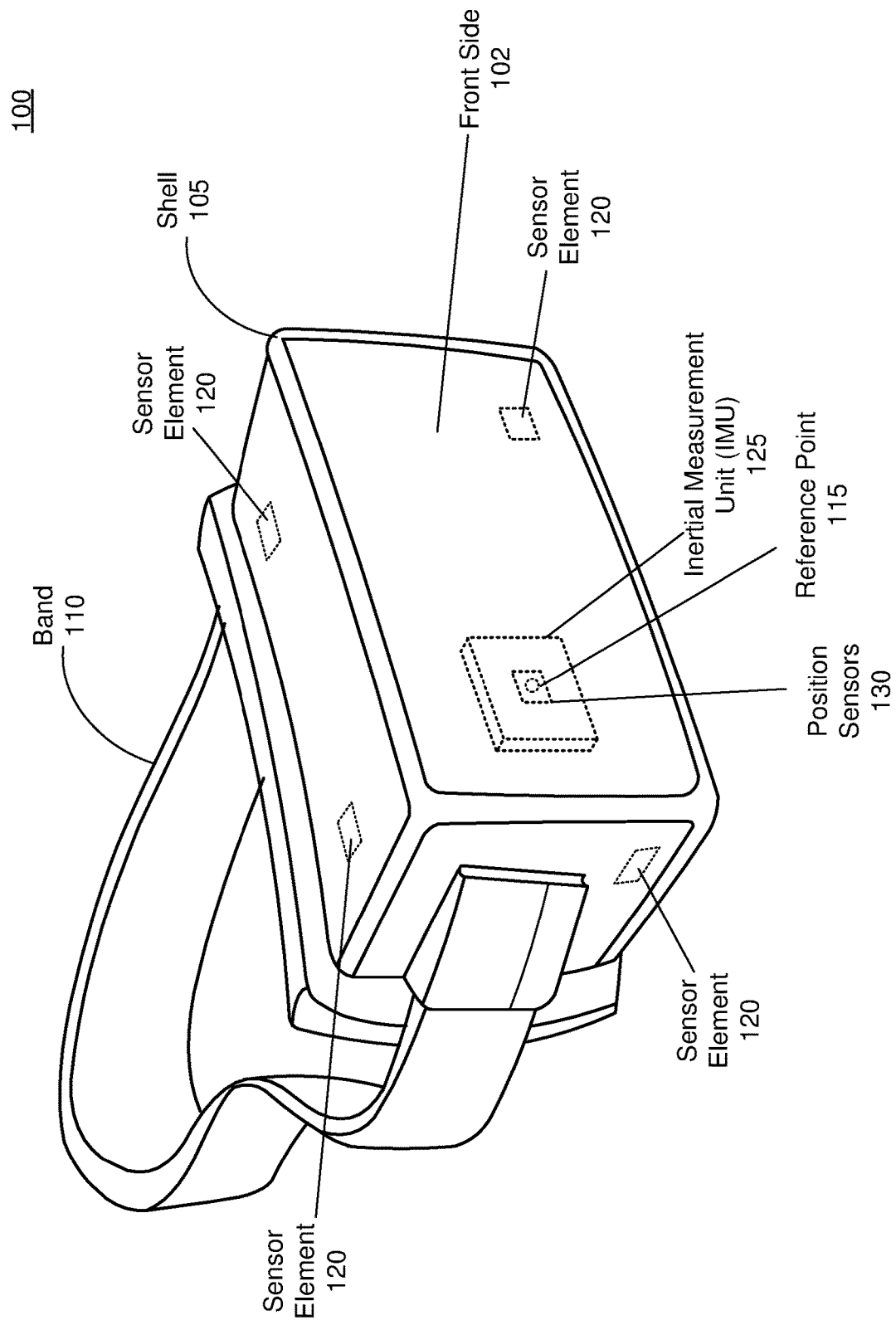
FIG. 1 is a diagram of a head-mounted display (HMD), in accordance with one or more embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a near-eye display (NED), a mobile device or computing system, or any other hardware platform capable of providing artificial reality content to one or more viewers.

An HMD displays content to a user. The HMD may be part of an artificial reality system. The HMD may include a display element, a shell, and a controller. The HMD may further include one or more sensor elements (e.g., a simultaneous localization and mapping (SLAM) system). Alternatively, the one or more sensor elements may be located externally, e.g., as part of a console coupled to the HMD. The shell encloses the display element and further includes a dynamic attenuator coupled to the controller. The dynamic attenuator includes one or more controllable pixels that control an amount of real world light provided to the user. The dynamic attenuator can be based on e.g., one or more liquid crystal elements or one or more electrochromic elements.

The HMD generates positional information for one or more objects in a local area surrounding the HMD based on light or radio frequency (RF) signals reflected from the one or more objects and captured by the one or more sensors. The positional information may include proximity information for the one or more objects in the local area, including range information for the one or more objects relative to the user wearing the HMD. Alternatively, the positional information may include a three-dimensional map of the local area including the one or more objects. The local area includes a three-dimensional environment surrounding the HMD. The controller determines, based on the positional information, whether the user wearing the HMD is within a threshold distance of a real object in the local area. In some embodiments, the controller determines whether the user is within the threshold distance of the real object by determining whether a certain reference point is within the threshold distance of the real object. The reference point may be located on an outside surface of the shell of the HMD, some other part of the HMD, on a body part of the user, or on a device (e.g., console) external to the HMD (assuming a relative position between the external device and the HMD is tracked).

Responsive to the determination that the user (or the reference point) is within the threshold distance of the real object in the local area, the controller identifies a field of view including the real object and an area surrounding the real object. Note that the determination whether the user is within the threshold distance of the real object may further include a prediction whether the user would enter, at some time instant in the future, a zone within a threshold range from the real object. Upon identifying the field of view that includes the real object, the controller instructs the dynamic attenuator to allow light from the local area into the HMD over at least the identified field of view. The controller also modifies content being presented by the display element such that the presented content has a lower resolution (e.g., wire frame, no content, etc.) and/or brightness over at least the identified field of view. The controller may also instruct a plurality of controllable pixels of the dynamic attenuator to provide a gradual change in attenuation of light depending on a distance from the real object. In this way, the user becomes aware of a real-world object (obstacle) located in the local area at a close proximity from the user, and thus the user can avoid collision with this object.

In some embodiments, the controller instructs the dynamic attenuator to temporarily allow light from the local area into the HMD in a wavelike manner. By allowing light from the local area into the HMD in the wavelike manner, the user may become aware of an entire or at least a portion of an environment surrounding the HMD, which improves user's awareness of real world objects that surround him/her.

In alternate embodiments, the dynamic attenuator may be part of a near-eye display (NED) to allow light from a local area surrounding the NED to an eye-box of the NED corresponding to a location of a user's eye. The NED may be part of an artificial reality system. The NED further includes a display element and an optical assembly. The display element of the MED is configured to emit image light. The optical assembly of the NED is configured to direct the image light (and optionally light from the local area) to the eye-box of the NED.

FIG. 1 is a diagram of an HMD 100, in accordance with one or more embodiments. The HMD 100 may be part of an artificial reality system. In embodiments that describe an AR system and/or a MR system, portions of a front side 102 of the HMD 100 are at least partially transparent in the visible band (~380 nm to 750 nm), and portions of the HMD 100 that are between the front side 102 of the HMD 100 and an eye of the user are at least partially transparent (e.g., a partially transparent electronic display). In some embodiments, portions of the HMD 100 that are at least partial transparent include one or more other parts of the HMD 100, e.g., a top portion of the HMD 100, a side portion of the HMD 100, a bottom portion of the HMD 100, etc. The HMD 100 includes a shell 105, a band 110, and a reference point 115. The HMD 100 may also include one or more sensor elements 120 configured to determine positional information (e.g., a proximity view, a depth map, etc.) for one or more objects of a local area surrounding some or all of the HMD 100. At least one of the sensor elements 120 may be a depth camera assembly configured to determine a depth map of the local area by capturing, e.g., structured light reflected from at least one object in the local area or by using some other depth sensing technique, e.g., passive stereo sensing, active stereo sensing, assisted stereo sensing, time-of-flight, or some combination thereof. In some embodiments, the sensor elements 120 may form at least a portion of a SLAM system for mapping of the local area and localization of one or more objects in the local area. In an alternate embodiment (not shown in FIG. 1), the one or more sensor elements 120 are not located on the shell 105, but instead are integrated into the band 110 of the HMD 100. In another alternate embodiment (not shown in FIG. 1), the one or more sensor elements 120 are not part of the HMD 100, but instead are implemented as part of some other device in the local area surrounding the HMD 100, e.g., a console or a base station coupled to the HMD 100 via a wired or wireless connection.

The shell 105 includes one or more display elements (not shown in FIG. 1), an Inertial Measurement Unit (IMU) 125, one or more position sensors 130, and the reference point 115. In the embodiment shown by FIG. 1, the position sensors 130 are located within the IMU 125, and neither the IMU 125 nor the position sensors 130 are visible to a user of the HMD 100. The IMU 125 is an electronic device that generates IMU data based on measurement signals received from one or more of the position sensors 130. A position sensor 130 generates one or more measurement signals in response to motion of the HMD 100. Examples of position sensors 130 include: one or more accelerometers, one or more gyroscopes, one or more magnetometers, another suitable type of sensor that detects motion, a type of sensor used for error correction of the IMU 125, or some combination thereof. The position sensors 130 may be located external to the IMU 125, internal to the IMU 125, or some combination thereof. Note that the illustrated positions of the position sensors 130, the reference point 115 and the IMU 125 on the front side of the HMD 100 are just an example, and these elements can be placed anywhere on the HMD 100. The shell 105 further includes a dynamic attenuator (not shown in FIG. 1) for controlling an amount of light from the local area into the HMD 100.

Figure 2:
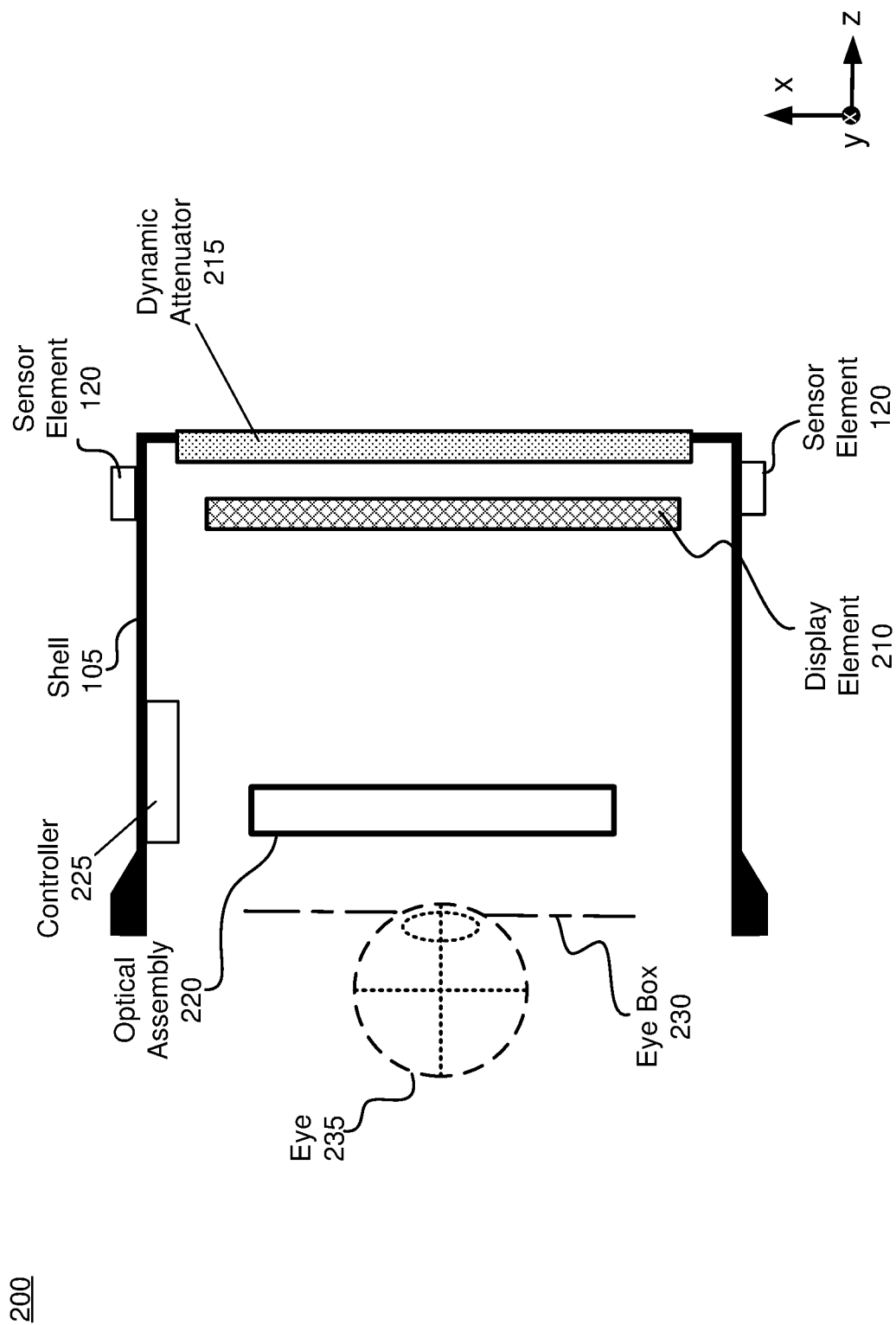
FIG. 2 is a cross section of a shell of the HMD in FIG. 1 enclosing a display element and including a dynamic attenuator, in accordance with one or more embodiments.

FIG. 2 is a cross section 200 of the shell 105 of the HMD 100 in FIG. 1 enclosing a display element 210 and including a dynamic attenuator 215, in accordance with one or more embodiments. The shell 105 further includes an optical assembly 220, a controller 225, and the one or more optional sensor elements 120. The display element 210 and the optical assembly 220 together provide image light to an eye box 230. The eye box 230 is a region in space that is occupied by a user's eye 235. For purposes of illustration, FIG. 2 shows a cross section 200 associated with a single eye 235, but another optical assembly 220, separate from the optical assembly 220, provides image light to another eye of the user.

The display element 210 emits image light toward the optical assembly 220. In various embodiments, the display element 210 may comprise a single display or multiple displays (e.g., a display for each eye of a user). Examples of the display element 210 include: a waveguide based display having a wide field of view, a liquid crystal display (LCD), a transparent organic light emitting diode (TOLED) display, some other display transparent to visible light, or some combination thereof. In some embodiments, the display element 210 may have one or more coatings, such as anti-reflective coatings. Additional details about waveguide based displays are described with regard to U.S. application Ser. No. 15/704,190, filed on Sep. 14, 2017, U.S. application Ser. No. 15/863,689, filed on Jan. 5, 2018, U.S. application Ser. No. 15/682,294, filed on Aug. 21, 2018, and U.S. application Ser. No. 15/670,730, filed on Aug. 7, 2018, which are incorporated by reference in their entireties.

The dynamic attenuator 215 controls an amount of light from a local area surrounding the HMD 100 reaching the eye box 230. The dynamic attenuator 215 may allow light from the local area over at least an identified field of view that includes a real object located within a threshold distance from a user wearing the HMD 100. In various embodiments, the dynamic attenuator 215 may comprise a single dynamic attenuator or multiple dynamic attenuators (e.g., a dynamic attenuator for each eye of the user). In one embodiment, operating the dynamic attenuator 215 to switch into a transparent mode (i.e., to be at least partially transparent) to allow light from the local area into the HMD 100 is automatic, e.g., instructed by the controller 225. In another embodiment, the user can manually instruct the dynamic attenuator 215 to switch into the transparent mode to allow light from the local area into the HMD 100.

The dynamic attenuator 215 comprises one or more controllable pixels that control the amount of light from the local area reaching the eye box 230. A controllable pixel is a pixel that can dynamically attenuate light. Examples of the controllable pixel are an electrochromic pixel, a liquid crystal (LC) cell with portions of two polarizers, or some combination thereof. In some embodiments, an entire area of the dynamic attenuator 215 becomes transparent upon receiving a corresponding instruction from the controller 225 to allow light from the local area to the eye box 230 over an entire field of view of the HMD 100. For example, the dynamic attenuator 215 may comprise a single large controllable pixel covering the entire field of view of the HMD 100 that can be controlled at a particular time instant to allow light from the local area over the entire field of view. When the dynamic attenuator 215 includes a plurality of controllable pixels, all of the plurality of controllable pixels can be controlled to allow light from the local area over the entire field of view of the HMD 100.

In some embodiments, the dynamic attenuator 215 allows light from the local area into the HMD 100 over a portion of the entire field of view (e.g., over the identified field of view), i.e., the dynamic attenuator 215 is partially transparent. The dynamic attenuator 215 may comprise a plurality of controllable pixels, and a corresponding portion of the controllable pixels is transparent (e.g., based on instructions from the controller 225) to allow light from the local area into the HMD 100 over the identified field of view. In one or more embodiments, when a distance between the user wearing the HMD 100 and the real object decreases over a time period (e.g., when the user moves toward a wall or some other obstacle), an area of the dynamic attenuator 215 that is transparent can progressively grow over the time period. Thus, light from the local area can propagate over a larger field of view and reach the eye box 230. For example, an enlarged field of view corresponding to a transparent portion of the dynamic attenuator 215 can be up to approximately 1 meter larger along each dimension relative to the initially identified field of view. The identified field of view corresponding to a transparent portion of the dynamic attenuator 215 can be initially, e.g., between approximately 5 degrees and 10 degrees, and having conical shape, squared shape, rectangular shape, or some other suitable shape. The identified field of view may grow over time as the distance between the user and the real object decreases to be, e.g., above approximately 100 degrees or even above approximately 200 degrees, depending on design of the HMD 100.

A transparent portion of the dynamic attenuator 215 (and a corresponding region of the local area from which light enters the HMD 100) may also increase in size or decrease in size based on a rate of change of a distance between the user and the object. If the rate of distance change is small (e.g., below a threshold rate), a rate of changing a size of the transparent portion of the dynamic attenuator 215 can be small. In contrast, if the rate of distance change is large (e.g., above the threshold rate), a rate of changing a size of the transparent portion of the dynamic attenuator 215 can be larger so that he/she has time to react to a physical object.

The dynamic attenuator 215 allows the HMD 100 to be used as a VR headset or an AR/MR headset. When the dynamic attenuator 215 blocks light from the local area, the HMD 100 operates as a VR headset. On the other hand, when the dynamic attenuator 215 allows light from the local area into the HMD 100, then the HMD 100 can operate as an AR/MR headset (if the HMD 100 overlays a real world image with some virtual content).

In some embodiments, the dynamic attenuator 215 is opaque (i.e., the dynamic attenuator 215 blocks light from the local area) when components of the dynamic attenuator 215 (e.g., the one or more controllable pixels) are in inactive state, which may be controlled by the controller 225 by powering off the dynamic attenuator 215. Accordingly, the dynamic attenuator 215 is transparent or partially transparent (i.e., at least a portion of the dynamic attenuator 215 allows light from the local area) when at least a portion of the components of the dynamic attenuator 215 are in active state (e.g., controlled by the controller 225). In some other embodiments, the dynamic attenuator 215 is opaque when the components of the dynamic attenuator 215 are in active state, which may be controlled by the controller 225 by powering on the dynamic attenuator 215. Accordingly, the dynamic attenuator 215 is transparent or partially transparent when at least a portion of the components of the dynamic attenuator 215 are in inactive state (e.g., the controller 225 powers off at least a portion of the dynamic attenuator 215).

In some embodiments, the one or more controllable pixels of the dynamic attenuator 215 include one or more controllable LC cells (not shown in FIG. 2). The LC cells of the dynamic attenuator 215 can be of any type of LC materials. An orientation of each LC cell of the dynamic attenuator 215 can be controlled by a voltage level generated based on, e.g., an instruction from the controller 225. The orientation of the LC cell in the dynamic attenuator 215 may determine a polarization of light propagated by the LC cell, which further determines a level of attenuation applied to the propagated light. The dynamic attenuator 215 based on the one or more controllable LC cells may further include polarization assemblies coupled to the one or more controllable LC cells for dynamically controlling polarization and consequently attenuation of light from the local area. More details about a structure and operation of the dynamic attenuator 215 that includes one or more controllable LC cells and polarization assemblies are provided in conjunction with FIGS. 3A-3B.

In some other embodiments, the one or more controllable pixels of the dynamic attenuator 215 include one or more controllable electrochromic elements. Each electrochromic element in the dynamic attenuator 215 can be electrically controlled by a corresponding electrical signal generated based on an instruction from the controller 225, either to block light from the local area or to pass light from the local area. Each electrochromic element in the dynamic attenuator 215 covers a portion of a field of view of the HMD 100. Activation of each electrochromic element in the dynamic attenuator 215 to pass light from the local area is based on whether a portion of a field of view of the HMD 100 covered by that electrochromic element is part of an identified field of view (e.g., identified by the controller 225) that includes a real object within a threshold distance from the user wearing the HMD 100.

The optical assembly 220 receives image light emitted from the display element 210 and potentially light from the local area propagating through the dynamic attenuator 215, and directs the image light and the light from the local area to the eye box 230 of the user's eye 235. In some embodiments, the optical assembly 220 also magnifies the received image light and the light from the local area, corrects optical aberrations associated with the image light and the light from the local area, and the corrected image light and the corrected light from the local area is presented to a user of the HMD 100. At least one optical element of the optical assembly 220 may be an aperture, a Fresnel lens, a positive lens, a negative lens, a reflective surface, a diffractive element, a waveguide, a filter, or any other suitable optical element that affects the image light and/or the light from the local area. Moreover, the optical assembly 220 may include combinations of different optical elements. In some embodiments, one or more of the optical elements in the optical assembly 220 may have one or more coatings, such as anti-reflective coatings, dichroic coatings, etc. Magnification of the image light and/or the light from the local area by the optical assembly 220 allows elements of the display element 210 and elements of the dynamic attenuator 215 to be physically smaller, weigh less, and consume less power than larger displays. Additionally, magnification may increase a field of view of displayed content. For example, the field of view of the displayed content is such that the displayed content is presented using almost all (e.g., 110 degrees diagonal), and in some cases all, of the user's field of view. In some embodiments, the optical assembly 220 is designed so its effective focal length is larger than the spacing to the display element 210, which magnifies the image light projected by the display element 210. Additionally, in some embodiments, the amount of magnification may be adjusted by adding or removing optical elements.

In some embodiments, to avoid having a focal distance in infinity when the display element 210 of the HMD 100 (or a display element of a NED) is implemented as a waveguide based display, a first optical element (e.g., one or more lenses) having a negative optical power (e.g., −1D) may be positioned in front of the display element 210 between the display element 210 and the optical assembly 220 (not shown in FIG. 2). Alternatively, the first optical element can be part of the optical assembly 220. When at least a portion of the dynamic attenuator 215 becomes transparent and light propagates from the local area, light reaching the eye box 230 may not be in focus due to the addition of first optical element having a negative optical power. For achieving that light from the local area is in focus at the eye box 230, a second optical element (e.g., one or more lenses) can be included between the dynamic attenuator 215 and the display element 210 (not shown in FIG. 2). An optical power of the second optical element can be opposite to that of the first optical element (e.g., +1D). Alternatively, the first optical element can be implemented as varifocal optical element having a variable optical power controlled by, e.g., the controller 225. Then, when at least a portion of the dynamic attenuator 215 becomes transparent and light propagates from the local area, an optical power of the first optical element can be adjusted such that light from the local area is in appropriate focus at the eye box 230 respective to the user.

In some embodiments, the shell 105 further includes the one or more sensor elements 120 for determining positional information for one or more objects in the local area surrounding the HMD 100. At least one of the sensor elements 120 may include an illumination source (not shown in FIG. 2) for emitting light to the local area. At least one sensor element 120 (and in some cases each sensor element 120) may further include a detector (not shown in FIG. 2) that captures light reflected from the local area and determines at least a portion of the positional information based on the captured reflected light. In one embodiment, at least one of the sensor elements 120 is a depth camera assembly configured to determine a depth map (i.e., three-dimensional map) of the local area. In another embodiment, the one or more sensor elements 120 represent proximity sensors configured to determine a proximity view of the local area, e.g., a view of the local area with information about proximity of one or more objects in the local area relative to the user wearing the HMD 100. The sensor elements 120 may be implemented to form at least a portion of a SLAM system for mapping the local area and localization of the one or more objects in the local area. Alternatively, the one or more sensor elements 120 acquire sensor data related to light reflected form the local area, and provide the acquired sensor data to, e.g., the controller 225 for determining the positional information for the one or more objects in the local area using the acquired sensor data. In one or more embodiments, the one or more sensor elements 120 are configured to determine the positional information based at least in part of RF signals received by the one or more sensor elements 120 after being reflected from one or more objects in the local area.

The controller 225 generates instructions for controlling operation of the dynamic attenuator 215 and controlling an amount of light from the local area to the eye box 230. In an embodiment when the dynamic attenuator 215 comprises one or more controllable LC cells, the controller 225 generates one or more instructions for controlling one or more voltage levels applied to the one or more controllable LC cells. In one embodiment, the controller 225 is coupled to the one or more sensor elements 120 and collects the positional information for the one or more objects in the local area from the one or more sensor elements 120. In another embodiment, the controller 225 obtains sensor data acquired by the one or more sensor elements 120 and determines the positional information for the one or more objects in the local area based on the acquired sensor data. In yet another embodiment, the controller 225 obtains e.g., via a wired or wireless link, the positional information for the one or more objects in the local area from the console or the base station where the one or more sensor elements 120 are integrated.

The controller 225 determines, based on the positional information, whether the user wearing the HMD 100 is within a threshold distance of an object in the local area. In some embodiments, the controller 225 determines whether the user is within the threshold distance of the object by determining whether the reference point 115 on the HMD 100 (or external to the HMD 100) is within the threshold distance of the object. Responsive to the determination, the controller 225 identifies a field of view that includes the object. The controller 225 then generates one or more appropriate instructions for controlling operation of the dynamic attenuator 215 to allow light from the local area over at least the identified field of view into the HMD 100 and to the eye box 230.

The controller 225 may control the dynamic attenuator 215 to effectively divide content presented on the display element 210 into two separate portions—one portion of the content outside of the identified field of view and another portion of the content covering the identified field of view. In this manner, the controller 225 controls the dynamic attenuator 210 to allow at least partial visibility of real world content from the local area through a portion of the display element 210 covering the identified field of view. Additionally, the controller 225 may reduce a brightness of a portion of the content presented on the display element 210 covering the identified field of view, so that the portion of the presented content appears invisible or less visible to the eye 235. Alternatively, the controller 225 can instruct usage of edge filters (e.g., a wire frame outline) for a portion of the presented content covering the identified field of view.

In some embodiments, the shell 105 further includes an eye tracking system (not shown in FIG. 2) that determines eye tracking information for the user's eye 235. The determined eye tracking information may comprise information about a position (including orientation) of the user's eye 235 in the eye box 230, i.e., information about an angle of an eye-gaze. In one embodiment, the eye tracking system illuminates the user's eye 235 with structured light. The eye tracking system can use locations of the reflected structured light in a captured image to determine the position of the user's eye 235. In another embodiment, the eye tracking system determines the position of the user's eye 235 based on magnitudes of image light captured over a plurality of time instants.

In some embodiments, the shell 105 further comprises a varifocal module (not shown in FIG. 2). The varifocal module may adjust focus of one or more images displayed on the display element 210, based on the eye tracking information obtained from the eye tracking system. In one embodiment, the varifocal module adjusts focus of the displayed images and mitigates vergence-accommodation conflict by adjusting a focal distance of the optical assembly 220 based on the determined eye tracking information. In other embodiment, the varifocal module adjusts focus of the displayed images by performing foveated rendering of the one or more images based on the determined eye tracking information. In one or more embodiments, the varifocal module adjusts an optical power of a corrective optical element included into the shell 105 to offset an optical power added by, e.g., the optical assembly 220 to light from the local area.

Figure 3A:
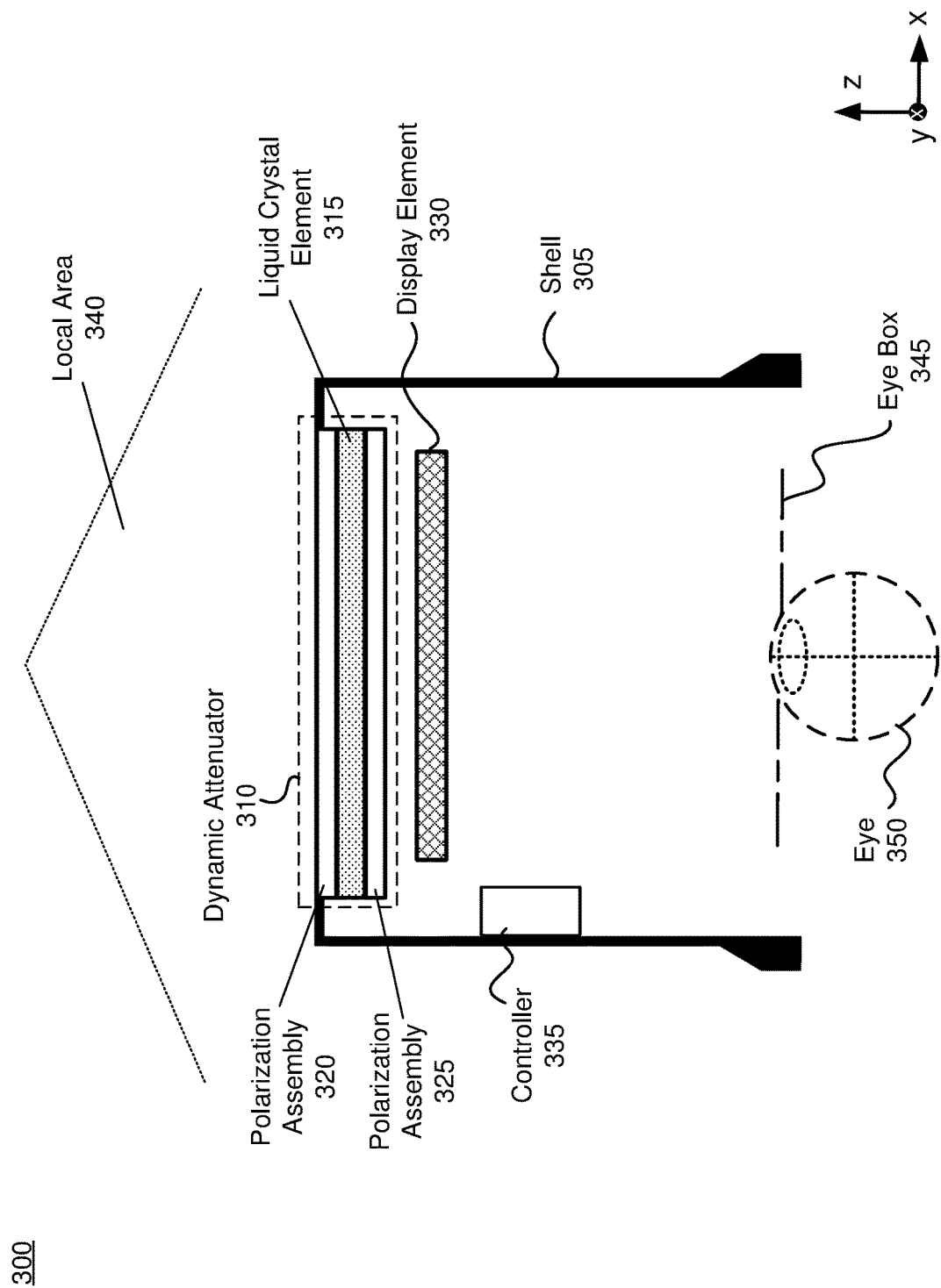
FIG. 3A is a cross section of the shell of the HMD in FIG. 1 with a dynamic attenuator comprising a liquid crystal (LC) element and a pair of polarization assemblies, in accordance with one or more embodiments.

FIG. 3A is a cross section 300 of a shell 305 with a dynamic attenuator 310 comprising a LC element 315 and polarization assemblies 320, 325, in accordance with one or more embodiments. As shown in FIG. 3A, each of the polarization assemblies 320, 325 is coupled to an opposite side of the LC element 315. In some embodiments (not shown in FIG. 3A), there is an air gap between the polarization assembly 320 and the LC element 315 and/or between the LC element 315 and the polarization assembly 325. The shell 305 further includes a display element 330, which may be positioned in front of the dynamic attenuator 310. The shell 305 further includes a controller 335 configured to control operations of the polarization assemblies 320, 325 and of the LC element 315. The shell 305 may be an embodiment of the shell 105 of the HMD 100 in FIG. 1, the dynamic attenuator 310 may be an embodiment of the dynamic attenuator 215 of FIG. 2, the display element 330 may be an embodiment of the display element 210 of FIG. 2, and the controller 335 may be an embodiment of the controller 225 of FIG. 2.

The dynamic attenuator 310 may fully attenuate, partially attenuate, or transmit light from the local area 340 based on voltage levels applied to the LC element 315 controlled by instructions from the controller 335. In the case of full attenuation, the dynamic attenuator 310 fully blocks propagation of light from the local area 340 to an eye box 345 of a user's eye 350. However, in some embodiments, even in the case of full attenuation, some small amount of light from the local area 340 may still propagate through the dynamic attenuator 310. In the case of partial attenuation, the dynamic attenuator 310 propagates light from the local area 340 over an identified field of view. In this case, a portion of the dynamic attenuator 310 covering the identified field of view is partially or fully transparent, whereas other portions of the dynamic attenuator 310 are opaque. In the case of full transparency, the dynamic attenuator 310 propagates light from the local area over an entire field of view. Even in the case of full transparency, the dynamic attenuator 310 may still introduce some losses to the light propagating from the local area 340, e.g., due to absorption and/or reflection of light by one or more components of the dynamic attenuator 310.

The LC element 315 of the dynamic attenuator 310 includes one or more controllable LC cells that control (e.g., based on applied voltage levels controlled by instructions from the controller 335) an amount of light from the local area 340 to the eye box 345. Resolution of the LC element may be, e.g., approximately 500×1000 LC cells.

The polarization assembly 320 polarizes light from the local area 340. The polarization assembly 320 receives the light from the local area 345 and transmits first polarized light having a first polarization (e.g., a linear polarization, circular polarization, etc.) to the LC element 315.

In the case of full attenuation, the one or more LC cells in the LC element 315 are oriented (e.g., based on one or more voltage levels controlled by the controller 335) such that the LC element 315 does not change polarization of the first polarized light transmitted as second polarized light from the LC element 315 to the polarization assembly 325. As a transmission axis of the polarization assembly 325 is orthogonal to that of the polarization assembly 320, the polarization assembly 325 blocks the second polarized light having polarization orthogonal to the transmission axis of the polarization assembly 325. In some embodiment, the same effect of full attenuation can be achieved using the polarization assemblies 320, 325 having the same polarization axes, wherein the one or more LC cells in the LC element 315 are oriented such that the one or more LC cells change polarization of incoming light by 90 degrees.

In the case of full transparency, the one or more LC cells in the LC element 315 are oriented (e.g., based on one or more voltage levels controlled by the controller 335) such that the LC element 315 changes polarization of the first polarized light such that the second polarized light transmitted from the LC element 315 to the polarization assembly 325 has a second polarization different than the first polarization (e.g., orthogonal to the first polarization). Then, the polarization assembly 325 fully propagates the second polarized light to the eye box 345. In some embodiment, the same effect of full transparency can be achieved using the polarization assemblies 320, 325 having the same polarization axes, wherein the one or more LC cells in the LC element 315 are oriented such that the one or more LC cells do not change polarization of incoming light.

In the case of partial attenuation, one or more LC cells in the LC element 315 are oriented (e.g., based on one or more voltage levels controlled by the controller 335) such that a portion of LC element 315 changes polarization of portions of the first polarized light into the second polarization. Additionally, one or more other LC cells in the LC element 315 are oriented such that another portion of the LC element 315 does not change polarization of portions of the first polarized light. Then, the polarization assembly 325 propagates portions of incoming light having the second polarization while blocking other portions of the incoming light having the first polarization, thus achieving partial attenuation. In some embodiments, as discussed above, the same effect of partial attenuation can be achieved using the polarization assemblies 320, 325 having the same polarization axes. In this case, the controller 335 is configured to appropriately control orientations of one or more LC cells in the LC element 315 covering a transparent portion of the dynamic attenuator 310 and one or more other LC cells in the LC element 315 covering an opaque portion of the dynamic attenuator 310.

In some embodiments, partial attenuation of light from the local area 340 can be also achieved when the LC element 315 partially rotates polarization (e.g., by 45 degrees) of at least a portion of the first polarized light received from the polarization assembly 320, e.g., based on one or more voltage levels applied to the LC element and controlled by the controller 335. In this case, the polarization assembly 325 partially propagates the portion of light coming from the LC element 315 having the rotated polarization, i.e., a light component having a polarization along a transmission axis of the polarization assembly 325 is transmitted while an orthogonal light component is blocked. In this manner, the dynamic attenuator 310 provides controllable attenuation of light from the local area 340 reaching the eye box 345. In some embodiment, the same effect of partial attenuation can be achieved using the polarization assemblies 320, 325 having the same polarization axes, wherein the one or more LC cells in the LC element 315 are oriented such that the one or more LC cells partially rotates polarization of incoming light (e.g., by 45 degrees).

In some embodiments, the polarization assembly 320 can be configured to switch an orientation of its transmission axis (e.g., based on instructions from the controller 335) such that the transmitted first polarized light is of the second polarization. On the other hand, the polarization assembly 325 is configured to transmit light of the second polarization and blocks light of the first polarization. By appropriately controlling the one or more controllable LC cells of the LC element 315, light from the local area 340 can be either blocked or propagated by the polarization assembly 325. In another embodiment, the polarization assembly 325 can be configured to switch an orientation of its transmission axis (e.g., based on instructions from the controller 335) such that the transmitted second polarized light is of the first polarization. Also, the polarization assembly 320 is configured to transmit light of the first polarization. Hence, again by appropriately controlling the one or more controllable LC cells of the LC element 315, light from the local area 340 can be either blocked or propagated by the polarization assembly 325.

In some embodiments, the polarization assembly 320 comprises a first linear polarizer having a transmission axis along a first direction. Thus, the first linear polarizer polarizes light from the local area 340 and transmits the first polarized light having linear polarization along the first direction. The LC element 315 may dynamically adjust a polarization of at least some of the received first polarized light and transmit the second polarized light, wherein at least a portion of the second polarized light has linear polarization along a second direction that is orthogonal to the first direction. The polarization assembly 325 may comprise a second linear polarizer having a transmission axis along the second direction. Thus, the polarization assembly 325 may propagate at least the portion of the second polarized light having linear polarization along the second direction to the eye box 345. Alternatively, orientations of the controllable LC cells of the LC element 315 may be controlled by the controller 335 such that the controllable LC cells do not change polarization of the first polarized light, i.e., the second polarized light transmitted by the LC element 315 has linear polarization along the first direction. Thus, the polarization assembly 325 blocks further propagation of the second polarized light having the same polarization of the first polarized light. Note that both the first linear polarizer of the polarization assembly 320 and the second linear polarizer of the polarization assembly 325 may introduce some losses to the first and second polarized light respectively due to reflection and/or absorption, i.e., the first and second linear polarizers may be also act as partially reflective polarizers and/or partially absorptive polarizers.

The polarization assembly 320 may further comprise a first quarter waveplate (not shown in FIG. 3A) adjacent to the first linear polarizer. Similarly, the polarization assembly 325 may further include a second quarter waveplate (not shown in FIG. 3A) adjacent to the second linear polarizer. In an embodiment where the first quarter waveplate is followed by the first linear polarizer, the first quarter waveplate converts circularly polarized light of a first handedness into first polarized light having linear polarization along a first direction that is further transmitted by the first linear polarizer. In another embodiment where the first linear polarizer is followed by the first quarter waveplate forming a first circular polarizer, the polarization assembly 320 generates the first polarized light as circularly polarized light of the first handedness. The polarization assembly 320 passes the first polarized light (e.g., linearly polarized or circularly polarized) onto the LC element 315. The first polarized light enters the LC element 315, and, depending on an orientation of a transmission axis of the polarization assembly 325 (i.e., in line or orthogonal with a transmission axis of the polarization assembly 320), the LC element 315 may or may not rotate polarization of the first polarized light. If, for example, the transmission axis of the polarization assembly 325 is orthogonal to the transmission axis of the polarization assembly 320, in order to block further propagation of the first polarized light, the LC element 315 may be configured to not rotate polarization of any portion of the first polarized light. To achieve the partial or full transparency, the LC element 315 may be configured to rotate polarization of at least a portion of the first polarized light, such that at least a portion of second polarized light (e.g., linearly polarized along a second direction orthogonal to the first direction or circularly polarized of a second handedness orthogonal to the first handedness) propagates through the polarization assembly 325 to reach the eye box 345.

On the other hand, when the transmission axis of the polarization assembly 325 is in line with the transmission axis of the polarization assembly 320, the LC element 315 may be configured to rotate polarization of the entire first polarized light, in order to block further propagation of the first second light. To achieve the full transparency, the LC element 315 may be configured to not rotate any portion of the first polarized light, so that the entire first polarized light propagates through the polarization assembly 325 and reaches the eye box 345. To achieve the partial transparency, the LC element 315 may be configured to rotate any portion of the first polarized light corresponding to any portion of a field of view of the local area 340 that should be blocked, and the LC element 315 may be configured to not rotate any other portion of the first polarized light corresponding to any other portion of the field of view of the local area 340 that should be visible to the eye 350.

The controller 335 may control the one or more LC cells of the LC element 315 to dynamically adjust a polarization of at least some of the received first polarized light to the second polarization. The controller 335 may control one or more voltage levels applied to the one or more LC cells to control orientation of the one or more LC cells. By controlling the applied voltage level(s) the controller 335 is able to control, for each of the one or more LC cells, an amount of light that is emitted from the dynamic attenuator 310 to the eye box 345. The dynamic attenuator 310 may fully attenuate, partially attenuate, or transmit light from the local area 340 in accordance with instructions from the controller 335.

The controller 335 may control an amount of attenuation for light emitted by the dynamic attenuator 310 by controlling voltage levels applied to the LC element 315. In the case of full attenuation, the controller 335 controls the dynamic attenuator 310 to fully block propagation of light from the local area 340 to the eye box 345. However, some small amount of light from the local area 340 may still propagate through the dynamic attenuator 310 even in the case of full attenuation. In the case of partial attenuation, the controller 335 controls the dynamic attenuator 310 to propagate light from the local area 340 over the identified field of view, i.e., a portion of the dynamic attenuator 310 covering the identified field of view is transparent, whereas other portions of the dynamic attenuator 310 are opaque. In the case of full transparency, the controller 335 controls the dynamic attenuator 310 to propagate light from the local area over an entire HMD's field of view. Note that, in the full transparency case, the dynamic attenuator 310 may still introduce some losses to the propagating light from the local area 340, e.g., due to light absorption and/or light reflection.

The controller 335 controls the one or more voltage levels to control orientation of the one or more LC cells in the LC element 315, wherein an orientation of each LC cell determines polarization of light emitted from that LC cell of the LC element 315. In the case of full attenuation, the controller 335 controls orientation of the one or more LC cells of the LC element 315 to propagate the first polarized light received from the polarization assembly 320 without changing its polarization. In this case, the polarization assembly 325 fully blocks further propagation of light received from the LC element 315 as a transmission axis of the polarization assembly 325 is orthogonal to a polarization direction of the incoming light.

On the other hand, the controller 335 may determine, based on positional information for one or more objects in the local area 340, that the user is within a threshold distance from an object in the local area 340. In this case, the controller 335 identifies a field of view that includes the object and a defined area surrounding the object. Alternatively, the controller identifies a field of view that includes the object and a defined angular range around the object. Then, the controller 335 instructs the dynamic attenuator 310 to allow light from the local area 340 over the identified field of view to the eye box 345. The controller 335 may control one or more voltage levels applied to the LC element 315 so that one or more LC cells are oriented to change polarization of at least portions of the first polarized light received from polarization assembly 320 corresponding to the identified field of view into the second polarization that matches a transmission axis of the polarization assembly 325. The polarization assembly 325 then propagates, over the identified field of view, portions of light received from the LC element 315 having the second polarization. Also, the polarization assembly 325 may block portions of light received from the LC element 315 having the first polarization. Thus, the polarization assembly 325 effectively allows propagation of light from the local area 340 over the identified field of view to the eye box 345. In one embodiment, the identified field of view is a field of view that includes the object in the local area 340 and the defined area surrounding the object. In another embodiment, the identified field of view is an entire HMD's field of view.

Figure 3B:
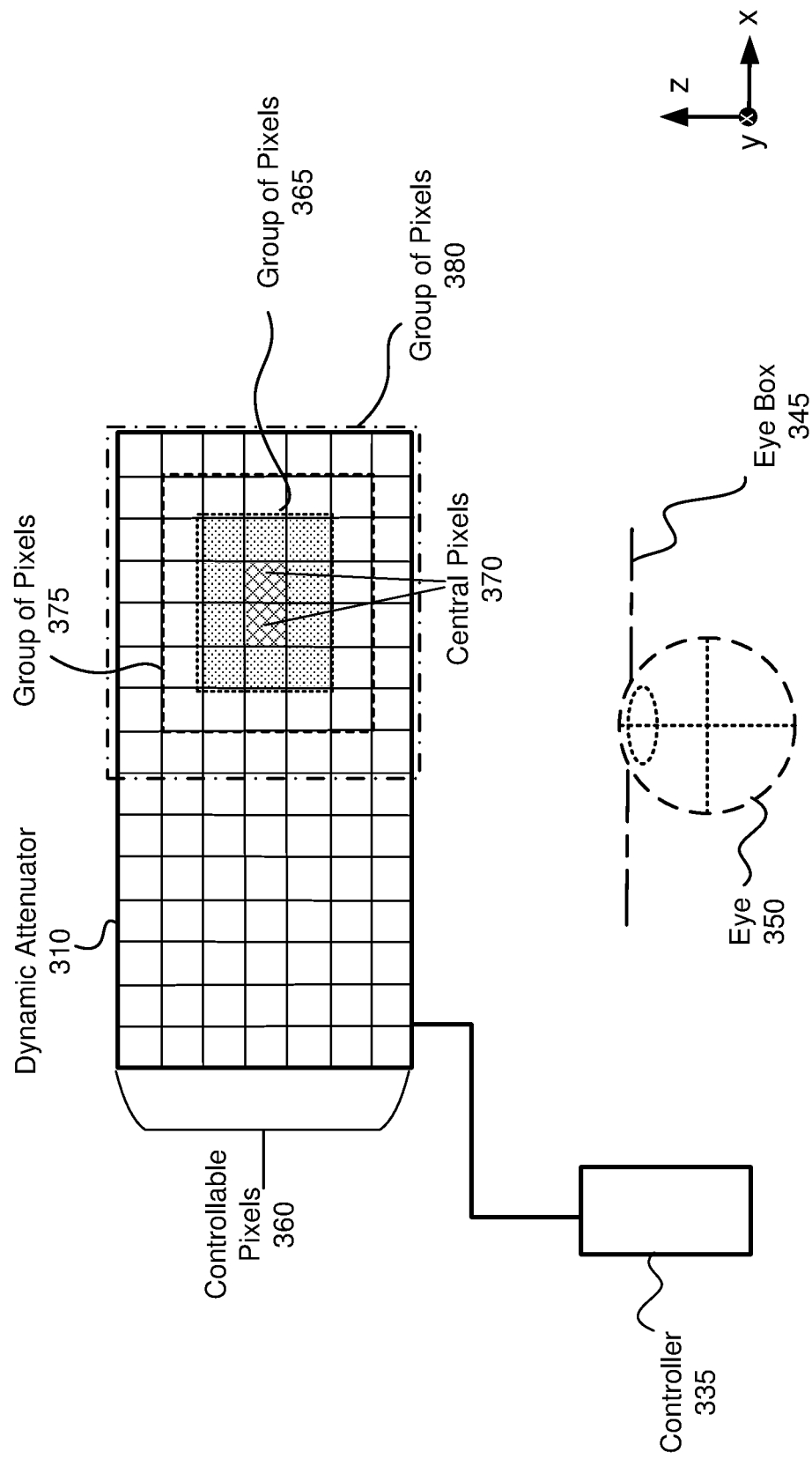
FIG. 3B is a view of the dynamic attenuator of FIG. 3A comprising a plurality of controllable pixels, in accordance with one or more embodiments.

FIG. 3B is a perspective view of the dynamic attenuator 310 of FIG. 3A, in accordance with one or more embodiments. The dynamic attenuator 310 includes a plurality of controllable pixels 360, wherein each controllable pixel 360 includes a LC cell sandwiched between two polarizers (not shown in FIG. 3B). An orientation of each LC cell of a pixel 360 may be controlled, e.g., based on a voltage level controlled based on an instruction from the controller 335 coupled to the dynamic attenuator 310. The controller 335 may identify a field of view that includes an object located within a threshold distance from the user. In this case, the controller 335 instructs the dynamic attenuator 310 to allow light from the local area over the identified field of view to the eye box 345. To achieve that, the controller 335 controls orientations of LC cells that correspond to a group of pixels 365 associated with the identified field of view so that the corresponding LC cells change polarization of incoming light into an appropriate polarization that would propagate through the polarization assembly 325 of FIG. 3A toward the eye box 345. The controller 335 also controls (e.g., via appropriate voltage levels) other controllable pixels 360 outside the identified field of view to effectively block propagation of light from the local area.

In some embodiments, the controller 335 is configured to instruct the dynamic attenuator 310 to vary attenuation of the light from the local area across adjacent pixels 360 within the group of pixels 365 that cover the identified field of view. The identified field of view may include the object in the local area located within the threshold distance from the user as well as an area surrounding the object. Central pixels 370 in the group of pixels 365 may propagate light from the local area that corresponds to the object (e.g., light reflected, scattered, and/or emitted from the object), whereas other pixels in the group of pixels 365 may propagate light corresponding to the area surrounding the object. The controller 335 may control an orientation of each LC cell within the group of pixels 365 such that the central pixels 370 provide a first level of attenuation to a portion of light from the local area that corresponds to the object and the other pixels in the group of pixels 365 provide a second level of attenuation to another portion of light from the local area that corresponds to the area surrounding the object, wherein the first level of attenuation is lower than the second level of attenuation. In general, the controller 335 may control an orientation of each LC cell in the group of pixels 365 that cover the identified field of view such that the attenuation of light progressively change (e.g., increase) as LC cells in the group of pixels 365 get further away from an area showing the object (e.g., from the central pixels 370).

A field of view of an HMD can be divided into one or more different regions that surround the identified field of view covered by the group of pixels 365. In the illustrative embodiment of FIG. 3B, a group of pixels 375 covers a first region of the field of view of the HMD, and a group of pixels 380 covers a second region of the field of view of the HMD, wherein the first and second regions surround the identified field of view. After controlling the group of pixels 365 to allow light from a corresponding portion of the local area including the object to the eye box 345, the controller 335 may instruct the dynamic attenuator 310 to allow light from the first and second regions to the eye box 345. The controller 335 may control, over a first time interval, the group of pixels 375 covering the first region of the HMD's field of view to allow light from a corresponding portion of the local area to the eye box 345. The controller 335 further controls, over a second time interval, the group of pixels 380 covering the second region of the HMD's field of view to allow light from another corresponding portion of the local area to the eye box 345. In this manner, by allowing light from different regions surrounding the identified field of view at different time instants, the ripple effect is effectively shown on the display element 330 of FIG. 3A. Using this wavelike operational mode of the dynamic attenuator 310, the user wearing the HMD may obtain information about his/her position in the local area (e.g., room) relative to other objects in the local area and boundaries in the local area, e.g., walls in the room and their relative positions. Furthermore, the controller 335 may control the dynamic attenuator 310 to allow other portions of the dynamic attenuator 310 to become transparent at certain time instants, such as portions of pixels that are adjacent to one another instead of being centered around the identified field of view (not shown in FIG. 3B). This operational mode of the dynamic attenuator 310 can be used, e.g., for calibration when a fast moving virtual object (e.g., rabbit) is tracked by the user's gaze while corresponding portions of the dynamic attenuator 310 are transparent at particular time instants. In this manner, mapping of the local area (e.g., room) can be performed.

In some embodiments, the controller 340 determines a number of times that the user (e.g., a reference point on the HMD) has been within the threshold distance from the object over a defined period of time. Responsive to the number being greater than a threshold value, the controller 335 instructs the dynamic attenuator 310 to allow light from the local area over an extended field of view larger than the identified field of view into the shell 305 and to the eye box 345. For example, the extended field of view can be between approximately 1.3 times and 3 times larger than the identified field of view, depending on the determined number of times. The extended field of view may be enlarged to include up to an entire field of view of the HMD. In one or more embodiments, the controller 335 can be configured to estimate a velocity of the user (e.g., speed and moving direction) and acceleration (e.g., changes in the speed and/or moving direction) to measure a rate of change of a distance between the object in the local area and the user. Based on the measurement, the controller 335 proactively predicts that the user would get within a threshold distance from the object (i.e., obstacle) and controls, via the dynamic attenuator 310, a size of the identified field view from where light from the local area is allowed into the HMD. If the rate of distance change is faster (e.g., above a threshold rate), the identified field view is larger and/or the threshold distance is larger, and vice versa. For example, if the user is moving fast toward the object—the threshold distance may be set such that it appears earlier to the user.

Figure 4A:
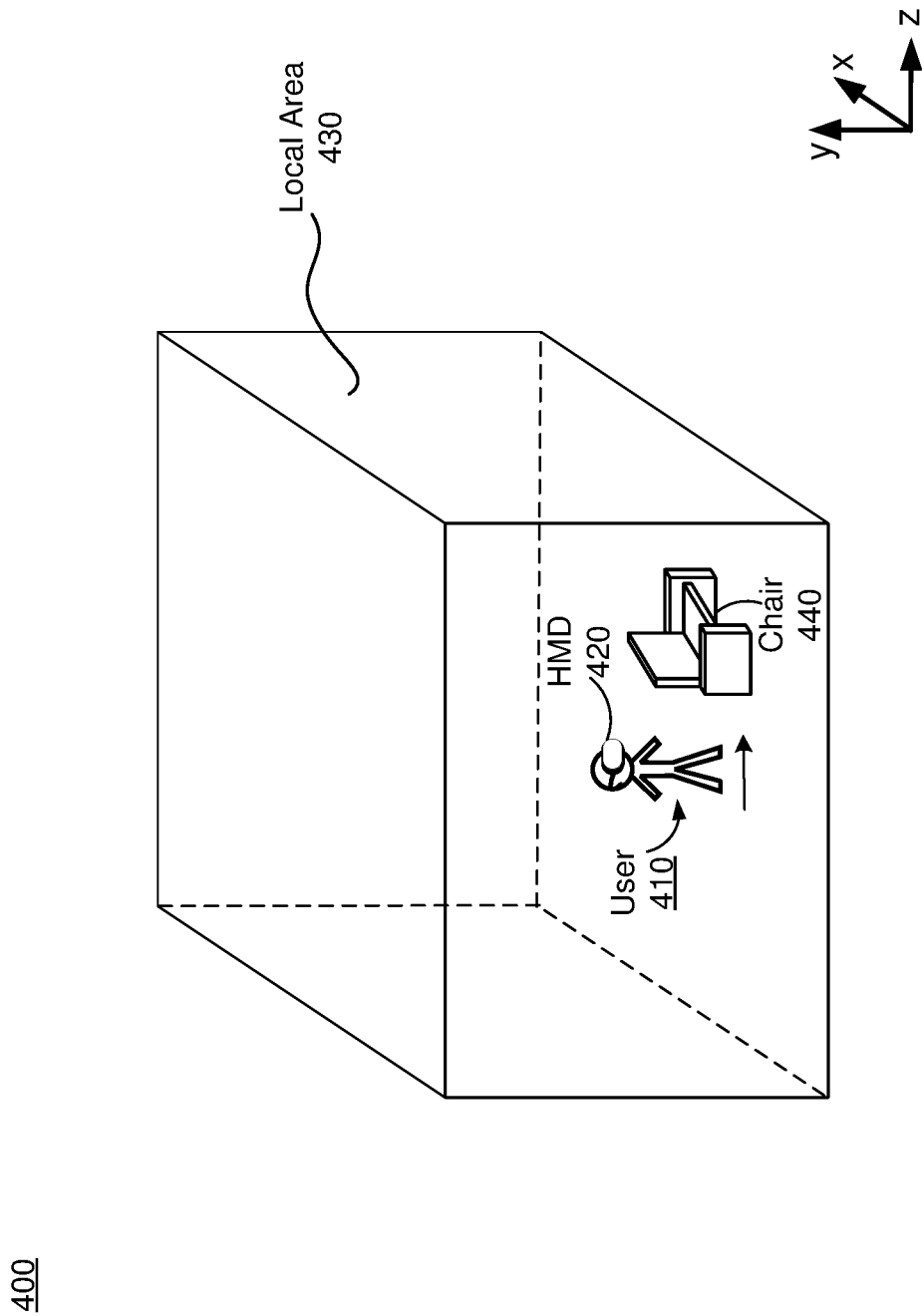
FIG. 4A is an example perspective view of a user wearing the HMD of FIG. 1 in a local area surrounding the HMD, in accordance with one or more embodiments.

FIG. 4A is a perspective view 400 of a user 410 wearing an HMD 420 in a local area 430 surrounding the HMD 420, in accordance with one or more embodiments. The HMD 420 may be an embodiment of the HMD 100 of FIG. 1. Alternatively, the HMD 420 may be a NED that can operate as a VR NED and potentially as an AR/MR NED. As shown in FIG. 4A, while watching virtual content presented by the HMD 420, the user 410 may move through the local area 430, e.g., toward a chair 440 representing an example real object in the local area 440. At a certain time instant, a controller of the HMD 420 may determine that the user 410 (e.g., a reference point on the HMD 420) is within a threshold distance from a closest surface of the chair 440. In this time instant, the controller may instruct a dynamic attenuator of the HMD 420 to allow light from the local area 430 into the HMD 420 over an identified field of view that includes at least a portion of the chair 440.

Figure 4B:
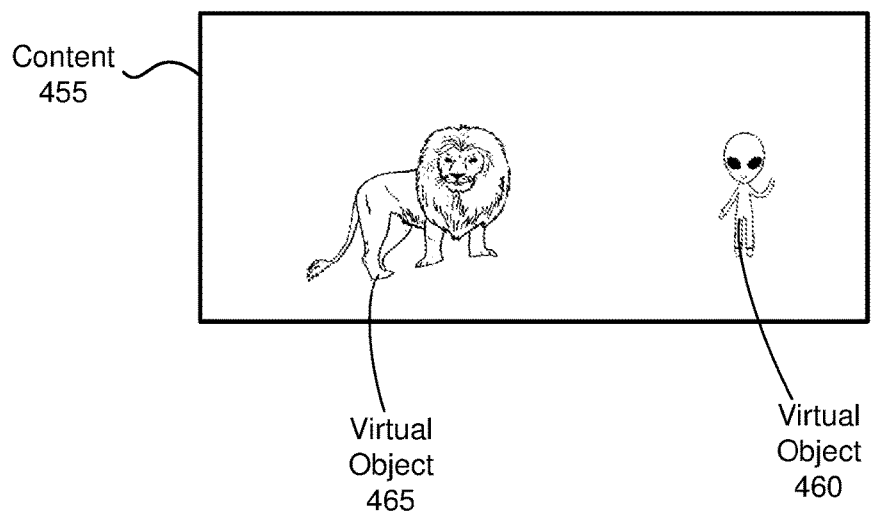
FIG. 4B is an example perspective view of content presented to the user wearing the HMD when the dynamic attenuator of FIG. 2 fully attenuates light from the local area, in accordance with one or more embodiments.

FIG. 4B is an example perspective view 450 of content 455 presented to the user 410 wearing the HMD 420, in accordance with one or more embodiments. The content 455 presented to the user 410 on a display of the HMD 420 may include virtual content, e.g., virtual objects 460, 465. The perspective view 450 shown in FIG. 4B may correspond to a first time instant when the user 410 is located from the chair 440 at a distance larger than the threshold distance. Thus, at the first time instant, a controller of the HMD 420 (e.g., the controller 225 of FIG. 2) instructs a dynamic attenuator of the HMD 420 (e.g., the dynamic attenuator 215) to block light from the local area surrounding the HMD 420, and the chair 440 is not visible to the user 410.

Figure 4C:
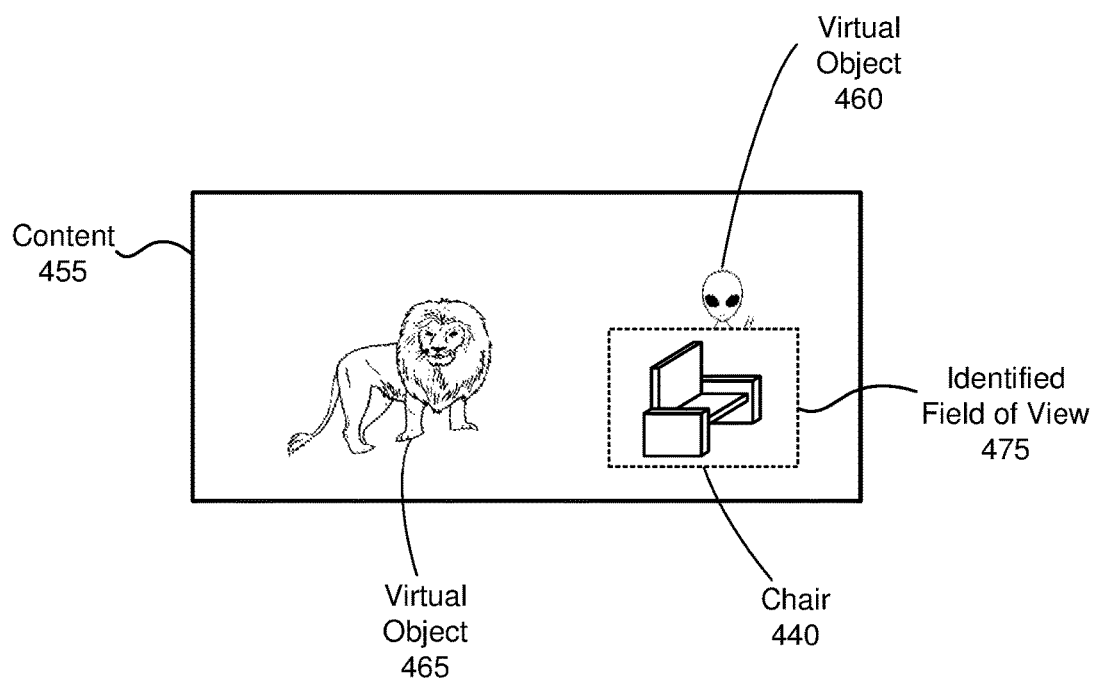
FIG. 4C is an example perspective view of content presented to the user wearing the HMD when the dynamic attenuator of FIG. 2 allows light from the local area into the HMD, in accordance with one or more embodiments

FIG. 4C is an example perspective view 470 of the updated content 455 presented to the user 410 wearing the HMD 420 when the dynamic attenuator of the HMD 420 allows light from the local area into the HMD 420, in accordance with one or more embodiments. The perspective view 470 shown in FIG. 4C may correspond to a second time instant when the user 410 is located within the threshold distance from the chair 440. At the second time instant, the controller of the HMD 420 instructs the dynamic attenuator of the HMD 420 to allow light from an identified field of view 475 of the local area that includes the chair 440 into the HMD 420. In the illustrative embodiment of FIG. 4C, the identified field of view 475 that includes the chair 440 becomes visible to the user 410. In the same time, at least a portion of the virtual object 460 occupying at least a portion of the identified field of view 475 becomes invisible to the user 410.

In some embodiments, the controller of the HMD 420 modifies the content 455 being presented to the user 410 by adjusting at least one feature (e.g., lowering resolution, reducing brightness, increasing color-space, etc.) of at least a portion of the content 455 presented over the identified field of view 475. As a result of the controller of the HMD 420 adjusting the at least one feature of the portion of the content 455 presented over the identified field of view 475, at least a portion of the virtual object 460 is not visible to the user 410 at the second time instant. The controller of the HMD 420 may control the dynamic attenuator of the HMD 420 to effectively divide the content 455 presented to the user 410 into two separate portions—one portion of the content 455 outside of the identified field of view 475 and another portion of the content 455 covering the identified field of view 475. In this manner, the dynamic attenuator allows at least partial visibility of content from the local area through a portion of the display element covering the identified field of view 475. Also, the controller may reduce a brightness of a portion of the content 455 (e.g., at least a portion of the virtual object 460) covering the identified field of view 475, so that at least the portion of the virtual object 460 appears invisible to the user 410. Alternatively, the controller can instruct usage of edge filters (e.g., a wire frame outline) for a portion of the content 455 covering the identified field of view 475.

Figure 5:
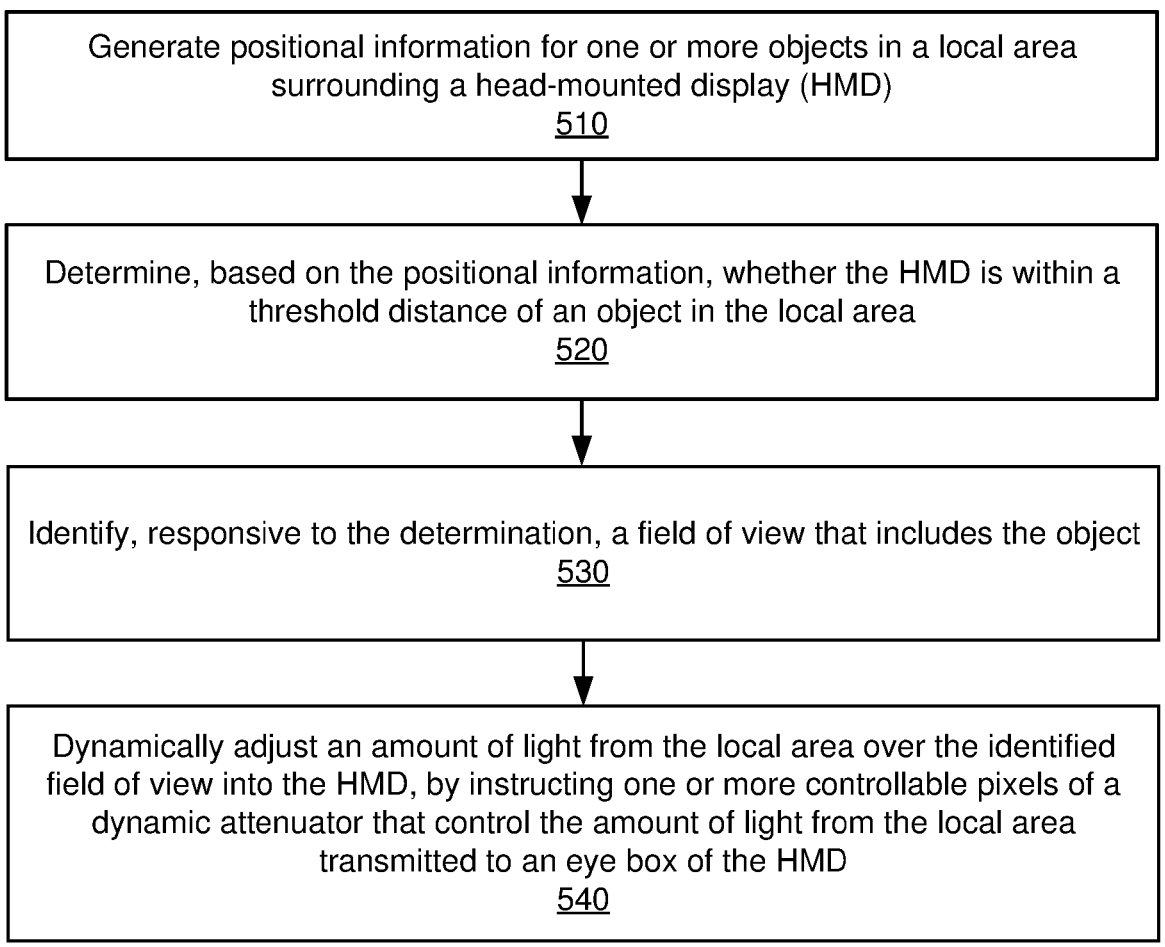
FIG. 5 is a flow chart illustrating a process of operating a dynamic attenuator as part of the HMD of FIG. 1, in accordance with one or more embodiments.

FIG. 5 is a flow chart illustrating a process 500 of operating a dynamic attenuator as part of the HMD 100 of FIG. 1, in accordance with one or more embodiments. The process 500 of FIG. 5 may be performed by the components of an HMD (e.g., the HMDs described above with reference to FIGS. 1-3A). Other entities (e.g., a console) may perform some or all of the steps of the process 500 in other embodiments. Likewise, embodiments may include different and/or additional steps, or perform the steps in different orders.

The HMD generates 510 (e.g., via one or more sensor elements) positional information for one or more objects in a local area surrounding the HMD. In an embodiment, the one or more sensor elements are proximity sensors configured to determine a proximity view of the local area. The proximity view may include information about at least one distance between a user wearing the HMD and at least one object in the local area. For example, the proximity view may include information about at least one distance between a reference point (e.g., located on the HMD or external to the HMD) and the at least one object. In another embodiment, the sensor elements 120 may form a SLAM system for mapping of the local area and localization of one or more objects in the local area. In yet another embodiment, the one or more sensor elements include at least one depth camera assembly that generates a depth (three-dimensional) map of the local area by capturing, e.g., structured light reflected from at least one object in the local area.

The HMD determines 520 (e.g., via a controller), based on the positional information, whether the HMD is within a threshold distance of an object in the local area. The threshold distance of the object can vary with a rate of change in a distance between the user and the object. The controller may obtain the positional information for the one or more objects in the local area from the one or more sensor elements and determine, based on the obtained positional information, at least one distance between the user wearing the HMD and the at least one object in the local area. In some embodiments, the controller obtains information about the depth map for the local area from the at least one depth camera assembly, and determines, based on the depth map, whether the HMD is within the threshold distance of the object. In some other embodiments, the controller obtains information about the proximity map for the local area, and determines, based on the proximity map, whether the HMD is within the threshold distance of the object.

Responsive to the determination 520, the HMD identifies 530 (e.g., via the controller) a field of view that includes the object. In one embodiment, the identified field of view is an entire field of view of the HMD. In another embodiment, the identified field of view is a field of view that includes the object and an area surrounding the object within the threshold distance of the object. In some embodiments, the controller is configured to modify content being presented on a display element of the HMD by adjusting at least one feature (e.g., lowering resolution, reducing brightness, increasing color-space, etc.) of at least a portion of the content presented over at least the identified field of view. The controller may deconstruct a scene presented on the display element in order to allow partial visibility of a real-world content from the local area over the identified field of view.

The HMD dynamically adjusts 540 (e.g., via a dynamic attenuator controlled by the controller) an amount of light from the local area over the identified field of view into the HMD, by instructing one or more controllable pixels of the dynamic attenuator that control the amount of light from the local area to an eye box of the HMD. In some embodiments, the dynamic attenuator comprises a plurality of controllable pixels, and the controller instructs the dynamic attenuator to vary attenuation of the light from the local area across adjacent pixels within a portion of the plurality of controllable pixels that cover the identified field of view. A field of view of the HMD may be divided into different regions that surround the identified field of view. In this case, responsive to the determination 520, the controller instructs the dynamic attenuator to allow light over a first time interval into the HMD from a first region of the field of view that is adjacent to the identified field of view, and the controller further instructs the dynamic attenuator to allow light over a second time interval following the first time interval into the HMD from a second region of the field of view that is adjacent to the first region. In some embodiments, the controller determines a number of times that the HMD has been within the threshold distance of the object over a defined period of time. Responsive to the number being greater than a threshold value, the controller instructs the dynamic attenuator to allow light from the local area over a field of view larger than the identified field of view into the HMD.

In one embodiment, the one or more controllable pixels of the dynamic attenuator include one or more controllable electrochromic elements. In another embodiment, the one or more controllable pixels of the dynamic attenuator include one or more controllable LC cells. In some embodiments, the dynamic attenuator further includes a first polarization assembly and a second polarization assembly both coupled to the one or more controllable LC cells. The first polarization assembly generates first polarized light that has a first polarization using light from the local area. The second polarization assembly transmits second polarized light from the one or more LC cells, wherein the second polarized light has a second polarization that is, e.g., orthogonal to the first polarization. The controller may control the one or more LC cells to dynamically adjust a polarization of at least some of the received first polarized light to the second polarization.

System Environment

Figure 6:
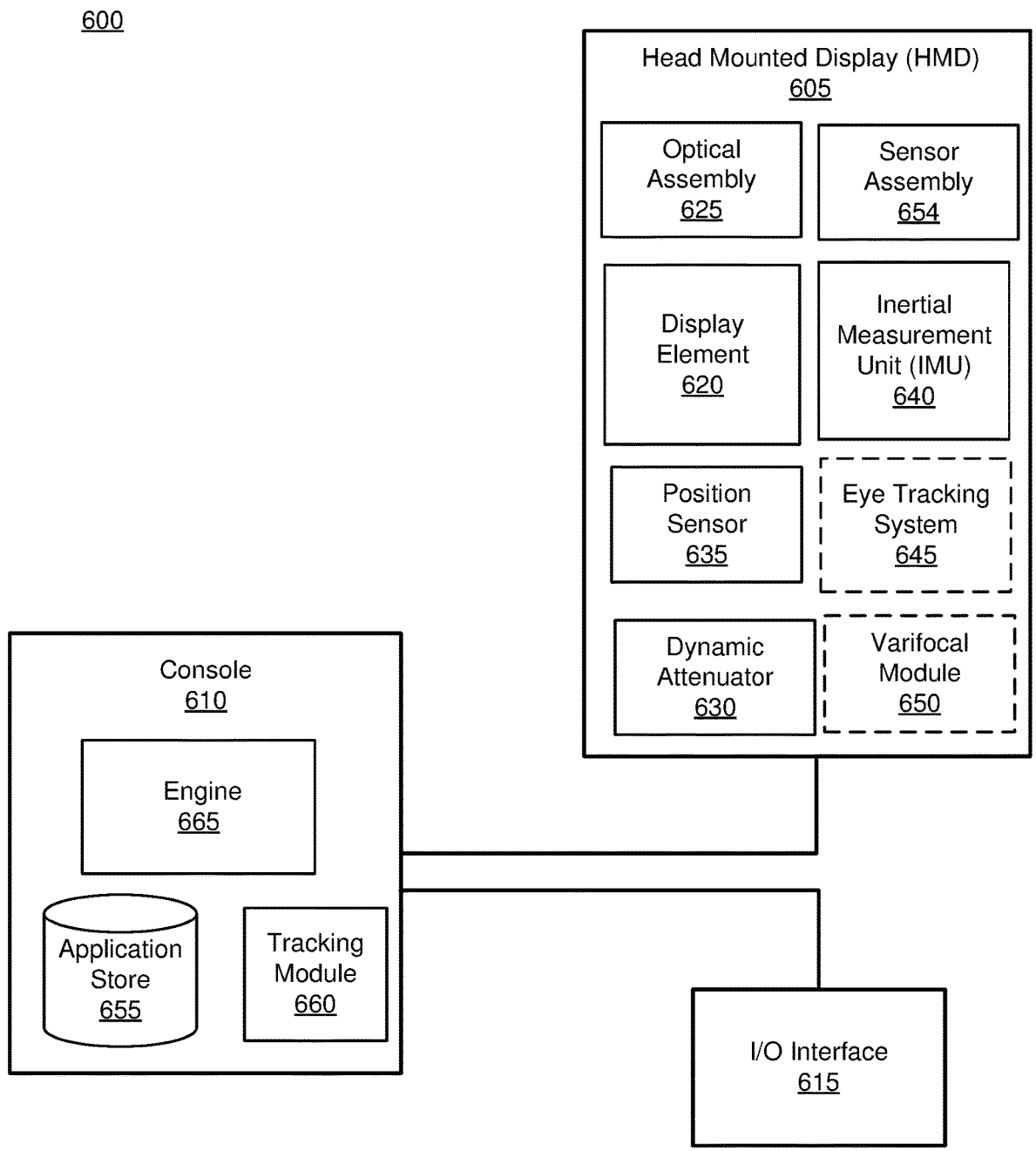
FIG. 6 is a block diagram of an HMD system in which a console operates, in accordance with one or more embodiments.

FIG. 6 is a block diagram of one embodiment of an HMD system 600 in which a console 610 operates. The HMD system 600 may operate in an artificial reality system. The HMD system 600 shown by FIG. 6 comprises an HMD 605 and an input/output (I/O) interface 615 that is coupled to the console 610. While FIG. 6 shows an example HMD system 600 including one HMD 605 and on I/O interface 615, in other embodiments any number of these components may be included in the HMD system 600. For example, there may be multiple HMDs 605 each having an associated I/O interface 615, with each HMD 605 and I/O interface 615 communicating with the console 610. In alternative configurations, different and/or additional components may be included in the HMD system 600. Additionally, functionality described in conjunction with one or more of the components shown in FIG. 6 may be distributed among the components in a different manner than described in conjunction with FIG. 6 in some embodiments. For example, some or all of the functionality of the console 610 is provided by the HMD 605.

The HMD 605 is a head-mounted display that presents content to a user comprising virtual and/or augmented views of a physical, real-world environment with computer-generated elements (e.g., two-dimensional (2D) or three-dimensional (3D) images, 2D or 3D video, sound, etc.). In some embodiments, the presented content includes audio that is presented via an external device (e.g., speakers and/or headphones) that receives audio information from the HMD 605, the console 610, or both, and presents audio data based on the audio information.

The HMD 605 includes a display element 620, an optical assembly 625, a dynamic attenuator 630, one or more position sensors 635, an IMU 640, a sensor assembly 654 an optional eye tracking system 650, and an optional varifocal module 655. Some embodiments of the HMD 605 have different components than those described in conjunction with FIG. 6. Additionally, the functionality provided by various components described in conjunction with FIG. 6 may be differently distributed among the components of the HMD 605 in other embodiments.

The display element 620 displays two-dimensional or three-dimensional images to the user in accordance with data received from the console 610. In various embodiments, the display element 620 comprises a single display or multiple displays (e.g., a display for each eye of a user). Examples of the display element 620 include: a waveguide based display having a wide field of view, a LCD, a TOLED display, some other display transparent to visible light, or some combination thereof. An embodiment of the display element 620 is the display element 210 of FIG. 2 or the display element 330 of FIG. 3A.

In some embodiments, the optical assembly 625 magnifies image light received from the display element 620 and/or corrects optical errors associated with the image light, and presents the corrected image light to a user of the HMD 605. The optical assembly 625 includes a plurality of optical elements. Example optical elements included in the optical assembly 625 include: an aperture, a Fresnel lens, a positive lens, a negative lens, a filter, a reflecting surface, or any other suitable optical element that affects image light. Moreover, the optical assembly 625 may include combinations of different optical elements. In some embodiments, one or more of the optical elements in the optical assembly 625 may have one or more coatings, such as partially reflective or anti-reflective coatings.

Magnification and focusing of the image light by the optical assembly 625 allows the display element 620 to be physically smaller, weigh less and consume less power than larger displays. Additionally, magnification may increase the field-of-view of the content presented by the display element 620. For example, the field-of-view of the displayed content is such that the displayed content is presented using almost all (e.g., approximately 110 degrees diagonal), and in some cases all, of the field-of-view. Additionally in some embodiments, the amount of magnification may be adjusted by adding or removing optical elements.

In some embodiments, the optical assembly 625 may be designed to correct one or more types of optical error. Examples of optical error include barrel or pincushion distortions, longitudinal chromatic aberrations, or transverse chromatic aberrations. Other types of optical errors may further include spherical aberrations, chromatic aberrations or errors due to the lens field curvature, astigmatisms, or any other type of optical error. In some embodiments, content provided to the display element 620 for display is pre-distorted, and the optical assembly 625 corrects the distortion when it receives image light from the display element 620 generated based on the content. An embodiment of the optical assembly 625 is the optical assembly 220 of FIG. 2.

The dynamic attenuator 630 is enclosed within a shell of the HMD 605. In various embodiments, the shell of the HMD 605 comprises a single dynamic attenuator or multiple dynamic attenuators (e.g., a dynamic attenuator for each eye of a user). The dynamic attenuator 630 comprises one or more controllable pixels that dynamically control an amount of light from a local area to an eye box of the HMD. A controller coupled to the dynamic attenuator 630 determines, based on positional information for one or more objects in the local area surrounding the HMD, whether the HMD is within a threshold distance of an object in the local area. Responsive to the determination, the controller identifies a field of view that includes the object. The controller instructs the dynamic attenuator 630 to allow light from the local area over the identified field of view into the HMD. An embodiment of the dynamic attenuator 630 is the dynamic attenuator 215 of FIG. 2 or the dynamic attenuator 310 of FIGS. 3A-3B.

In some embodiments, the HMD 100 includes the sensor assembly 654. In some embodiments, some or all of the sensor assembly 654 is part of another device. For example, some or all of the sensor assembly 654 may be part of the console 610 and/or base station (not shown in FIG. 6) and track the HMD 605 from one or more locations within the local area. In one embodiment, the sensor assembly 654 includes at least one depth camera assembly that generates a depth map of the local area surrounding the HMD 605. In other embodiment, the sensor assembly 654 generates a proximity map for the local area with information about at least one distance between, e.g., a reference point of the HMD 605 and at least one object in the local area. The sensor assembly 654 captures data describing proximity information for the local area surrounding some or all of the HMD 605. A module of the HMD 605 (e.g., the controller) can compute the proximity information using the data (e.g., based on a captured portion of a light pattern), or the sensor assembly 654 can send this information to another device such as the console 610 that can determine the proximity information using the data from the sensor assembly 654. An embodiment of the sensor assembly 654 is the plurality of sensor elements 120 of FIG. 1.

The IMU 640 is an electronic device that generates data indicating a position of the HMD 605 based on measurement signals received from one or more of the position sensors 635 and from proximity information received from the sensor assembly 654. A position sensor 635 generates one or more measurement signals in response to motion of the HMD 605. Examples of position sensors 635 include: one or more accelerometers, one or more gyroscopes, one or more magnetometers, another suitable type of sensor that detects motion, a type of sensor used for error correction of the IMU 640, or some combination thereof. The position sensors 635 may be located external to the IMU 640, internal to the IMU 640, or some combination thereof.

Based on the one or more measurement signals from one or more position sensors 635, the IMU 640 generates data indicating an estimated current position of the HMD 605 relative to an initial position of the HMD 605. For example, the position sensors 635 include multiple accelerometers to measure translational motion (forward/back, up/down, left/right) and multiple gyroscopes to measure rotational motion (e.g., pitch, yaw, roll). An embodiment of the position sensor 635 is the position sensor 130 of FIG. 1. In some embodiments, the IMU 640 rapidly samples the measurement signals and calculates the estimated current position of the HMD 605 from the sampled data. For example, the IMU 640 integrates the measurement signals received from the accelerometers over time to estimate a velocity vector and integrates the velocity vector over time to determine an estimated current position of a reference point on the HMD 605. Alternatively, the IMU 640 provides the sampled measurement signals to the console 610, which interprets the data to reduce error. The reference point is a point that may be used to describe the position of the HMD 605. The reference point may generally be defined as a point in space or a position related to the HMD's 605 orientation and position. An embodiment of the IMU 640 is the IMU 125 of FIG. 1.

In some embodiments, the eye tracking system 645 is integrated into the HMD 605. The eye tracking system 645 determines eye tracking information associated with an eye of a user wearing the HMD 605. The eye tracking information determined by the eye tracking system 645 may comprise information about an orientation of the user's eye, i.e., information about an angle of an eye-gaze. In some embodiments, the eye tracking system 645 is integrated into the optical assembly 625. An embodiment of the eye-tracking system 645 may comprise an illumination source and an imaging device (camera).

In some embodiments, the varifocal module 650 is further integrated into the HMD 605. The varifocal module 650 may be coupled to the eye tracking system 645 to obtain eye tracking information determined by the eye tracking system 645. The varifocal module 650 may be configured to adjust focus of one or more images displayed on the display element 620, based on the determined eye tracking information obtained from the eye tracking system 645. In this way, the varifocal module 650 can mitigate vergence-accommodation conflict in relation to image light. The varifocal module 650 can be interfaced (e.g., either mechanically or electrically) with at least one of the display element 620 and at least one optical element of the optical assembly 625. Then, the varifocal module 650 may be configured to adjust focus of the one or more images displayed on the display element 620 by adjusting position of at least one of the display element 620 and the at least one optical element of the optical assembly 625, based on the determined eye tracking information obtained from the eye tracking system 645. By adjusting the position, the varifocal module 650 varies focus of image light output from the display element 620 towards the user's eye. The varifocal module 650 may be also configured to adjust resolution of the images displayed on the display element 620 by performing foveated rendering of the displayed images, based at least in part on the determined eye tracking information obtained from the eye tracking system 645. In this case, the varifocal module 650 provides appropriate image signals to the display element 620. The varifocal module 650 provides image signals with a maximum pixel density for the display element 620 only in a foveal region of the user's eye-gaze, while providing image signals with lower pixel densities in other regions of the display element 620. In one or more embodiments, the varifocal module 650 adjusts an optical power of a corrective optical element included into the HMD 605 to offset an optical power added by, e.g., the optical assembly 625 to light from the local area.

The I/O interface 615 is a device that allows a user to send action requests and receive responses from the console 610. An action request is a request to perform a particular action. For example, an action request may be an instruction to start or end capture of image or video data or an instruction to perform a particular action within an application. The I/O interface 615 may include one or more input devices. Example input devices include: a keyboard, a mouse, a game controller, or any other suitable device for receiving action requests and communicating the action requests to the console 610. An action request received by the I/O interface 615 is communicated to the console 610, which performs an action corresponding to the action request. In some embodiments, the I/O interface 615 includes an IMU 640 that captures IMU data indicating an estimated position of the I/O interface 615 relative to an initial position of the I/O interface 615. In some embodiments, the I/O interface 615 may provide haptic feedback to the user in accordance with instructions received from the console 610. For example, haptic feedback is provided when an action request is received, or the console 610 communicates instructions to the I/O interface 615 causing the I/O interface 615 to generate haptic feedback when the console 610 performs an action.

The console 610 provides content to the HMD 605 for processing in accordance with information received from one or more of: the sensor assembly 654, the HMD 605, and the I/O interface 615. In the example shown in FIG. 6, the console 610 includes an application store 655, a tracking module 660, and an engine 665. Some embodiments of the console 610 have different modules or components than those described in conjunction with FIG. 6. Similarly, the functions further described below may be distributed among components of the console 610 in a different manner than described in conjunction with FIG. 6.

The application store 655 stores one or more applications for execution by the console 610. An application is a group of instructions, that when executed by a processor, generates content for presentation to the user. Content generated by an application may be in response to inputs received from the user via movement of the HMD 605 or the I/O interface 615. Examples of applications include: gaming applications, conferencing applications, video playback applications, or other suitable applications.

The tracking module 660 calibrates the HMD system 600 using one or more calibration parameters and may adjust one or more calibration parameters to reduce error in determination of the position of the HMD 605 or of the I/O interface 615. For example, the tracking module 660 communicates a calibration parameter to the sensor assembly 654. Calibration performed by the tracking module 660 also accounts for information received from the IMU 640 in the HMD 605 and/or an IMU 640 included in the I/O interface 615. Additionally, if tracking of the HMD 605 is lost (e.g., the sensor assembly 654 lose line of sight of at least a threshold number of light elements), the tracking module 660 may re-calibrate some or all of the HMD system 600.

The tracking module 660 tracks movements of the HMD 605 or of the I/O interface 615 using information from the sensor assembly 654, the one or more position sensors 635, the IMU 640 or some combination thereof. For example, the tracking module 650 determines a position of a reference point of the HMD 605 in a mapping of a local area based on information from the HMD 605. The tracking module 660 may also determine positions of the reference point of the HMD 605 or a reference point of the I/O interface 615 using data indicating a position of the HMD 605 from the IMU 640 or using data indicating a position of the I/O interface 615 from an IMU 640 included in the I/O interface 615, respectively. Additionally, in some embodiments, the tracking module 660 may use portions of data indicating a position or the HMD 605 from the IMU 640 as well as representations of the local area from the sensor assembly 654 to predict a future location of the HMD 605. The tracking module 660 provides the estimated or predicted future position of the HMD 605 or the I/O interface 615 to the engine 655.

The engine 665 generates a 3D mapping of the area surrounding some or all of the HMD 605 (i.e., the "local area") based on information received from the HMD 605. In some embodiments, the engine 665 determines depth information for the 3D mapping of the local area based on information received from the sensor assembly 654 that is relevant for techniques used in computing depth. The engine 665 may calculate depth information using one or more techniques in computing depth from structured light. In various embodiments, the engine 665 uses the depth information to, e.g., update a model of the local area, and generate content based in part on the updated model.

The engine 665 also executes applications within the HMD system 600 and receives position information, acceleration information, velocity information, predicted future positions, or some combination thereof, of the HMD 605 from the tracking module 660. Based on the received information, the engine 665 determines content to provide to the HMD 605 for presentation to the user. For example, if the received information indicates that the user has looked to the left, the engine 665 generates content for the HMD 605 that mirrors the user's movement in a virtual environment or in an environment augmenting the local area with additional content. Additionally, the engine 665 performs an action within an application executing on the console 610 in response to an action request received from the I/O interface 615 and provides feedback to the user that the action was performed. The provided feedback may be visual or audible feedback via the HMD 605 or haptic feedback via the I/O interface 615.

In some embodiments, based on the eye tracking information (e.g., orientation of the user's eye) received from the eye tracking system 645, the engine 665 determines resolution of the content provided to the HMD 605 for presentation to the user on the display element 620. The engine 665 provides the content to the HMD 605 having a maximum pixel resolution on the display element 620 in a foveal region of the user's gaze, whereas the engine 665 provides a lower pixel resolution in other regions of the display element 620, thus achieving less power consumption at the HMD 605 and saving computing cycles of the console 610 without compromising a visual experience of the user. In some embodiments, the engine 665 can further use the eye tracking information to adjust where objects are displayed on the display element 620 to prevent vergence-accommodation conflict.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A head-mounted display (HMD) comprising:
a shell enclosing a display element and including a dynamic attenuator, the dynamic attenuator comprising a plurality of controllable pixels that control an amount of light from a local area transmitted to an eye box of the HMD; and
a controller configured to:
determine, based on positional information for one or more objects in the local area surrounding the HMD, whether the HMD is within a threshold distance of an object of the one or more objects in the local area,
responsive to the determination, identify a field of view that includes the object,
affect polarization of at least a portion of light from the local area by controlling orientations of cells of the controllable pixels in the dynamic attenuator, and
adjust a level of attenuation of the light coming over the identified field of view into the HMD by affecting the polarization of at least the portion of light.

2. The HMD of claim 1, wherein the controller is further configured to:
modify content being presented on the display element by adjusting at least one feature of at least a portion of the content presented over at least the identified field of view.

3. The HMD of claim 2, wherein the controller is further configured to:
modify the content being presented on the display element by reducing at least one of a brightness and a level of detail in a portion of the content presented on the display element over at least the identified field of view.

4. The HMD of claim 1, further comprising one or more sensor elements configured to capture data that are used to generate the positional information.

5. The HMD of claim 1, wherein the identified field of view is an entire field of view of the HMD.

6. The HMD of claim 1, wherein the identified field of view is a field of view that includes the object and a defined angular range around the object.

7. The HMD of claim 1, wherein the controller is further configured to:
instruct the dynamic attenuator to vary the level of attenuation of the light from the local area across adjacent pixels of the dynamic attenuator, the adjacent pixels located within a portion of the dynamic attenuator that covers the identified field of view.

8. The HMD of claim 1, wherein a field of view of the HMD is divided into different regions that surround the identified field of view, and responsive to the determination the controller is further configured to:
instruct the dynamic attenuator to allow light over a first time interval into the HMD from a first region of the field of view that is adjacent to the identified field of view; and
instruct the dynamic attenuator to allow light over a second time interval following the first time interval into the HMD from a second region of the field of view that is adjacent to the first region.

9. The HMD of claim 1, wherein the controller is further configured to:
measure a rate of change of a distance between the object in the local area and the HMD; and
instruct the dynamic attenuator to allow light from the local area over a field of view having a size based on the measurement.

10. The HMD of claim 1, wherein the controllable pixels of the dynamic attenuator include controllable liquid crystal (LC) cells.

11. The HMD of claim 10, wherein the dynamic attenuator further comprises:
a first polarization assembly configured to generate first polarized light that has a first polarization using the light from the local area; and
a second polarization assembly configured to transmit second polarized light from the LC cells.

12. The HMD of claim 11, wherein the controller is further configured to:
control the LC cells to dynamically adjust a polarization of at least some of the received first polarized light to a second polarization different than the first polarization.

13. The HMD of claim 11, wherein:
the first polarization assembly comprises a first linear polarizer having a transmission axis along a first direction, and
the second polarization assembly comprises a second linear polarizer having a transmission axis along a second direction orthogonal to the first direction.

14. The HMD of claim 11, wherein:
the first polarization assembly comprises a first circular polarizer transmitting light of a first handedness, and
the second polarization assembly comprises a second circular polarizer transmitting light of a second handedness that is orthogonal to the first handedness.

15. A method comprising:
generating positional information for one or more objects in a local area surrounding a head-mounted display (HMD);
determining, based on the positional information, whether the HMD is within a threshold distance of an object of the one or more objects in the local area;
responsive to the determination, identifying a field of view that includes the object;
affecting polarization of at least a portion of light from the local area by controlling orientations of cells of a plurality of controllable pixels in a dynamic attenuator included in a shell enclosing a display element of the HMD; and
adjusting a level of attenuation of the light coming over the identified field of view into the HMD by affecting the polarization of at least the portion of light.

16. The method of claim 15, further comprising:
modifying content being presented on the display element by adjusting at least one feature of at least a portion of the content presented over at least the identified field of view.

17. The method of claim 16, further comprising:
modifying the content being presented on the display element by reducing a brightness of a portion of the content presented on the display element over at least the identified field of view.

18. The method of claim 15, further comprising:
instructing the dynamic attenuator to vary the level of attenuation of the light from the local area across adjacent pixels of the dynamic attenuator, the adjacent pixels located within a portion of the dynamic attenuator that covers the identified field of view.

19. The method of claim 15, wherein a field of view of the HMD is divided into different regions that surround the identified field of view, and the method further comprising:
    responsive to the determination, instructing the dynamic attenuator to allow light over a first time interval into the HMD from a first region of the field of view that is adjacent to the identified field of view; and
    responsive to the determination, instructing the dynamic attenuator to allow light over a second time interval following the first time interval into the HMD from a second region of the field of view that is adjacent to the first region.

\* \* \* \* \*